(12) United States Patent
Anders et al.

(10) Patent No.: US 7,384,000 B2
(45) Date of Patent: Jun. 10, 2008

(54) DURABLE PLASTIC MINI CARD AND METHOD FOR TESTING ITS DURABILITY

(75) Inventors: Drew Anders, Skippack, PA (US); Tim Wright, Montgomeryville, PA (US)

(73) Assignee: Gemplus, Gemenos (FR)

( * ) Notice: Subject to any disclaimer, the term of this patent is extended or adjusted under 35 U.S.C. 154(b) by 72 days.

(21) Appl. No.: 10/893,308

(22) Filed: Jul. 19, 2004

(65) Prior Publication Data

US 2006/0011731 A1    Jan. 19, 2006

(51) Int. Cl.
G06K 19/02    (2006.01)

(52) U.S. Cl. .................... 235/488; 235/487; 235/489

(58) Field of Classification Search ............. 235/488, 235/482, 380, 487, 489; 283/98, 89, 56; 428/43
See application file for complete search history.

(56) References Cited

U.S. PATENT DOCUMENTS

| 3,583,317 | A  | * | 6/1971  | Gibson ............... 283/98 |
| 5,495,981 | A  |   | 3/1996  | Warther |
| 5,863,076 | A  |   | 1/1999  | Warther |
| 6,092,841 | A  | * | 7/2000  | Best et al. ............ 283/56 |
| 6,305,716 | B1 |   | 10/2001 | Warther et al. |
| 6,471,127 | B2 | * | 10/2002 | Pentz et al. .......... 235/487 |
| 6,644,551 | B2 |   | 11/2003 | Clayman et al. |
| 6,644,552 | B1 | * | 11/2003 | Herslow ............... 235/488 |
| 6,964,377 | B1 | * | 11/2005 | Haghiri et al. ........ 235/492 |
| 2005/0175807 | A1 | * | 8/2005 | Bilodeau ............ 428/43 |

OTHER PUBLICATIONS

The Nilson Report, Issue #811, May 2004, pp. 1-11.

* cited by examiner

*Primary Examiner*—Daniel A Hess
(74) *Attorney, Agent, or Firm*—Buchanan Ingersoll & Rooney PC

(57) ABSTRACT

A mini card has a size smaller than a card that conforms to established standards, and includes a hole for attachment to a key ring or other external device. Increased durability is provided by means of a substrate that includes a core made of PVC material, sandwiched between two durable layers of polyester material. Printing on these layers is protected by transparent overlay layers made of PVC. The durability of the card is measured by means of a test procedure in which random multi-dimensional motion is imparted to an assembly of the card and an attached weight. The durability is quantitatively indicated by the amount of elapsed time until the weight becomes separated from the card while undergoing the vibrational movement.

37 Claims, 4 Drawing Sheets

DURABLE PLASTIC MINI CARD AND METHOD FOR TESTING ITS DURABILITY

FIELD OF THE INVENTION

The present invention is directed to plastic cards that store information pertaining to the respective holders of such cards, such as credit cards, identification cards, and the like, and more particularly to plastic cards known as "mini cards" that have a size smaller than the dimensions of a conventional plastic transaction or identification card that conforms to a published standard for such cards.

BACKGROUND OF THE INVENTION

Plastic cards containing personalized information have become ubiquitous components of many aspects of modem life. For example, credit cards and debit cards are used to purchase goods and services, identification cards provide their holders with access to restricted areas, and ATM cards enable patrons to conduct monetary transactions with financial institutions. Personal information of the card holder that pertains to the transaction to be performed, e.g. account numbers, identification data, etc., is stored in the card. The storage mechanism can be a magnetic stripe on the card. In the case of a smart card, the information is stored in an electronic memory within a chip embedded into the card, either in lieu of or in addition to a magnetic stripe.

Many cards of these types have a size which conforms to the international standard ISO/IEC 7810. This standard defines a card having a nominal width of about 86 mm, a nominal height of about 54 mm, and a nominal thickness of 0.76 mm. Cards of this size are well known and readily adapted to be carried in a holder's wallet, pocketbook, purse or the like.

Recently, plastic cards having a smaller size than this standard format have become popular. Such cards are sometimes known as "mini cards". Examples of such cards are depicted in U.S. Pat. No. 6,471,127 and D467,247. For instance, a mini card might have a width of 66 mm and a height of 40 mm. The card can also have a non-standard shape, as shown, for example, in U.S. Patent No. D462,966.

One of the advantages of the smaller size of the mini card is that it can be easily carried with other items commonly found on a person, such as a set of keys. For this reason, as illustrated in the previously cited patents, the mini card may be provided with a hole that enables it to be attached to a key ring. Typically, the hole might be located at one corner of the card.

The ability to attach the mini card to other everyday items can result in stresses being placed upon the card that are not typically encountered by standard format cards. For instance, when not in use, a standard card is often carried in a protective environment, such as a wallet or a purse. In contrast, a mini card attached to a key ring is likely to be subjected to much more stress and abrasion. Even the simple acts of hanging the keys on a hook or turning a key in the ignition of a motor vehicle can cause the mini card to be flung against other objects. Of particular significance is the stress that is placed upon the area around the hole that serves as the point of attachment to the keys or other external objects. Over time, the periphery of the hole will be subjected to a significant amount of abrasion. Furthermore, the corner of the card where the hole is located will undergo an appreciable amount of torque stresses, due to normal use.

A conventional plastic transaction card is constructed as a multi-layer structure. A core layer made of Teslin® (a polyolefin-based microporous film) is sandwiched between two PVC printed layers. Transparent PVC overlay layers outside of the printed layers form the exterior surfaces of the card. Although superior to a card made only with PVC layers, this construction still results in a relatively brittle structure that constrains the durability of a mini card. The flexure and torque that is experienced by the mini card can lead to cracking, particularly in the vicinity of the keyhole.

SUMMARY OF THE INVENTION

The present invention is directed, in one aspect, to a card structure that provides increased durability, and therefore greater resistance to failure, than the conventional structure that is employed for standard plastic transaction and identification cards. In accordance with one embodiment of the invention, the mini card is comprised of a core made of relatively rigid material, e.g. PVC, which is sandwiched between two layers of durable material, for example a polyester such as PET. These durable layers can also provide the surfaces upon which graphics can be printed. An overlay layer, which might be made of PVC material, can be used to cover each of the two durable layers, to form the exterior surfaces of the mini card. A card having such a construction has been demonstrated to exhibit significantly higher resistance to failure than mini cards having the same structure as conventional standard plastic cards.

A second aspect of the invention pertains to the testing of mini cards to determine their relative durability. In accordance with this aspect of the invention, a weight is attached to the card so that it is freely movable relative to the card. For example, a set of keys can be attached to the card by means of a key ring. The card is affixed to a device that imparts vibrational movement to the mini card in a manner that permits the attached weight to move relative to the card, and thereby exert torque and flexure forces on the card. Preferably, the vibrational device imparts three-dimensional movement to the card, so that the attached weight moves in all directions relative to the card. An exemplary device that provides such movement is a commercial paint shaker.

Once the mini card and attached weight are affixed to the vibrational device, the device is actuated and a timer is started. The elapsed time is measured until the weight becomes separated from the mini card. By comparing different mini cards under the same test conditions, their measured time-to-failure provides a quantitative measure of their durability, relative to one another.

Further features of the invention, and the advantages provided thereby, are explained in detail hereinafter, with reference to exemplary embodiments illustrated in the accompanying figures.

DETAILED DESCRIPTION

To facilitate an understanding of the principles upon which the present invention is based, an exemplary embodiment of a mini card having a generally rectangular shape is described hereinafter. It will be appreciated, however, that the shape of the card is not a limiting aspect of the invention. Rather, the principles of the invention are applicable to any type of mini card having dimensions which are smaller than those of a card that conforms to a published standard, such as ISO/IEC 7810, and that is designed to be used in a non-protective environment.

Techniques for manufacturing plastic cards having a size smaller than that defined by the ISO/IEC standard are known. One example of such a card is a subscriber identification module (SIM) that is utilized, for example, in wireless communication devices. Typically, the SIM card is manufactured on a support that conforms to the standard card format. The standard-size card is manufactured in a manner such that the SIM card can be broken away from the remaining structure of the standard card. For example, cutouts or recesses can be made in the standard card to define the perimeter of the SIM card, and facilitate breaking the SIM card away from the remaining structure.

Figure 1:
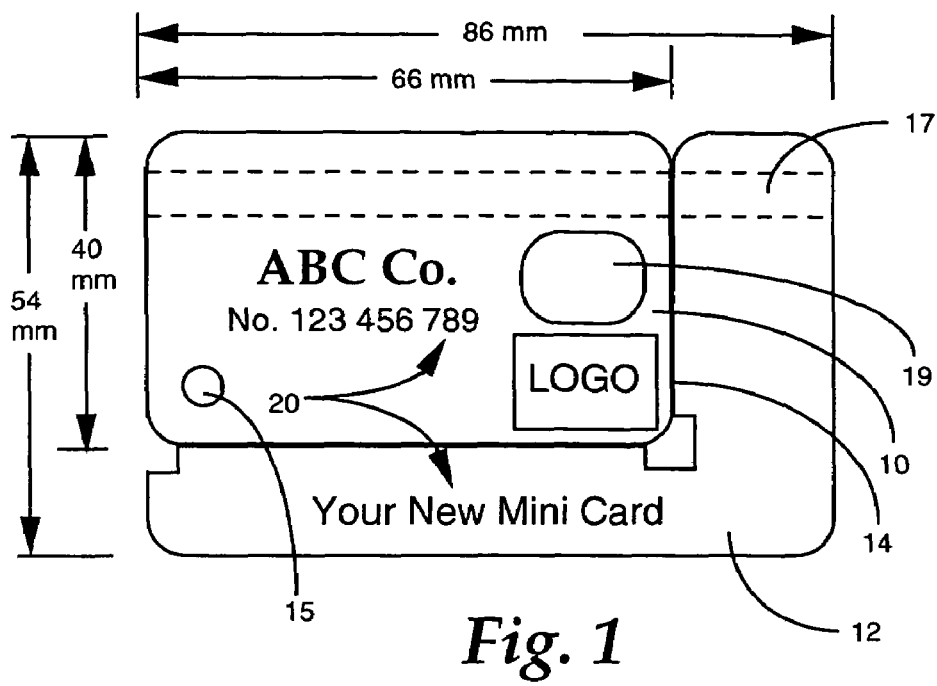
FIG. 1 is a plan view of a mini card attached to its supporting frame.

A mini card can be manufactured in much the same manner. FIG. 1 is a top plan view of a mini card 10 connected to a disposable support, or frame 12. The mini card and the frame together conform to the size of a standard card, having a generally rectangular shape with a nominal width of 86 mm and a nominal height of 54 mm. The mini card 10 is defined by a recess 14 that is cut into one or both of the surfaces of the standard card. These recesses define the profile of the mini card, which in the illustrated example is also of rectangular shape. The mini card might have a nominal width of 66 mm and a nominal height of 40 mm. An attachment hole 15 is located near one corner of the mini card. The hole 15 can have a diameter of about 5 mm, to accommodate a key ring.

Figure 2:
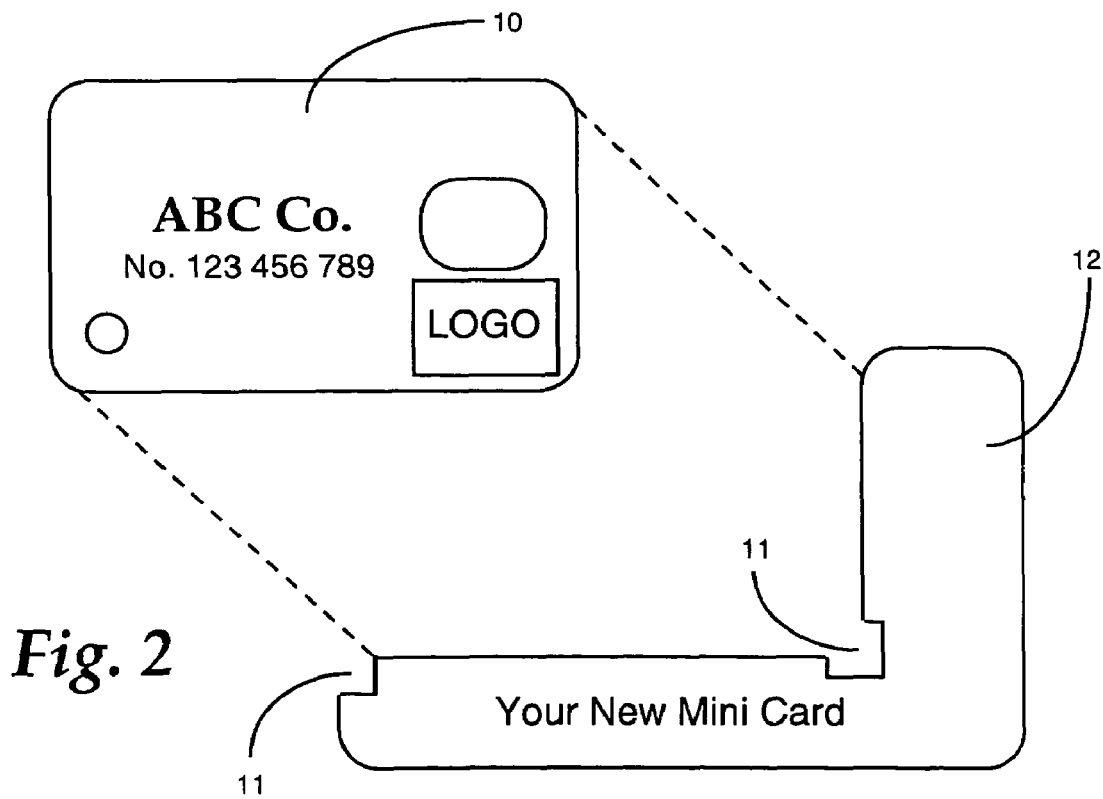
FIG. 2 is a view of the mini card separated from the frame.

Typically, the mini card is delivered to the consumer in the form in which it is attached to the frame 12, as shown in FIG. 1. By employing a combined mini card and frame that conforms to standard plastic card sizes, conventional manufacturing processes can be employed. In addition, the handling of the cards and delivery to the consumer is simplified. Once the consumer is ready to use the mini card, it is broken away from the frame, as depicted in FIG. 2. Notches 11 can be punched or cut out of the frame 12 at the locations of the corners of the mini card 10, to facilitate breaking the mini card away from the frame. Once the mini card is separated, the frame 12 can be disposed of. Alternatively, the frame might be further divided by additional recesses (not shown), to provide an ID tag or the like.

Graphics 20 are typically printed on one or both sides of the card, to identify the provider of the card, e.g. bank, retail company, or employer, and/or other information pertinent to the function of the card. The graphics are located at least within the area of the mini card 10. Since the mini card is presented to the user in the form in which it is still attached to the frame 12, additional graphics can also be printed on the frame.

If the card is of the type in which data is stored on a magnetic stripe, such a stripe 17 can be provided on the card in a known manner, typically on its back surface, such that it extends across the area of the mini card. If the card is of the smart card type, an electronic module (not shown) containing a memory is embedded in the card. Communication between the module and a terminal can be carried out by means of contacts in an area 19. Alternatively, or in addition, an antenna (not shown) can be incorporated into the structure of the card to provide contactless communication with the electronic module. In the absence of contacts, the area 19 can be used for a security hologram.

Figure 3:
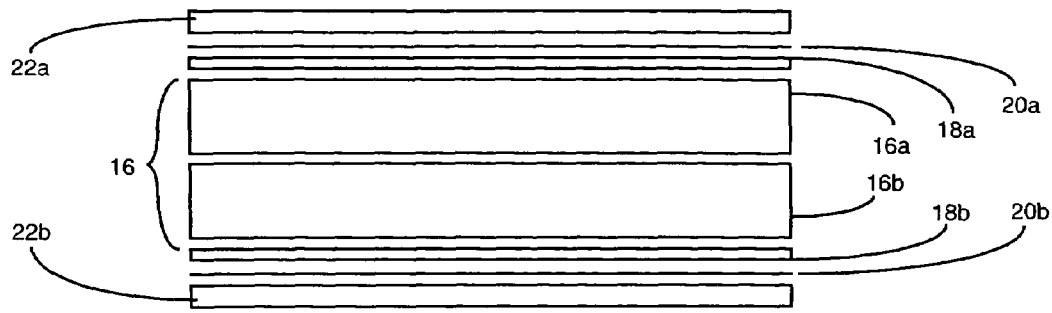
FIG. 3 is a cross-sectional exploded view of the structure of the mini card.

The structure of the mini card is illustrated in the exploded, cross-sectional view of FIG. 3. The card comprises a symmetrical, sandwich-like structure. At the center of the card is a core sheet 16 made from a relatively rigid plastic material, such as polyvinyl chloride (PVC). In practice, the core can be constructed of two PVC layers 16a, 16b. Each layer can have a thickness of about 0.011 in., ±0.002 in. Layers of durable plastic material 18a, 18b are disposed on either side of the core 16. These layers might have a thickness in the range of 0.0005-0.0060 in., preferably about 0.0010 in. The durable layers also form printable surfaces upon which the graphics 20 can be printed. The printing is represented by layers of ink 20a, 20b in FIG. 3. The printed graphics are protected by means of transparent overlay layers 22a, 22b made, for example, of PVC. The overlay layers can have a thickness in the range of 0.001-0.004 in., preferably about 0.002 in.

The durable layers 18a and 18b are made of a polyester film having a tensile strength in the range of 28,000-34,000 psi, using the ASTM D 882 test method. One example of a suitable material which exhibits this property is polyethylene terephthalate (PET). Other properties of this material include a strength at 5% elongation of 14,000-15,000 psi, tensile modulus of 710,000-740,000, and dimensional stability of 0.3-0.6% at 105° C. and 1.0-1.8% at 150° C. Other properties of a polyester film that make it suitable for the durable layer include tear strength initiation (Graves) in the range of 18-54 hg/mm and tear strength propagation values of 500-1100 g/mm. In addition to PET, other materials that can be used for the durable layers include acrylonitrile butadiene styrene (ABS), nylon, Viton®, ethylene propylene diene monomer (EPDM), polytetrafluoroethylene (PTFE), polypropylene (PP) and PEN.

In one process of manufacturing the cards, the durable layers 18 and the core 16 are laminated to one another by means of an adhesive, to form the card substrate. A suitable adhesive for this purpose has high room-temperature tackiness to facilitate film attachment, and is heat-settable to promote strong bonds after lamination. Preferably, it is a water-based, polymeric, heat-activated laminating clear and colorless material capable of bonding to a low-energy substrate, since virgin untreated polyester film has a low surface energy of around 30 dyne, which makes it difficult to bond with other materials. After lamination, the adhesive should exceed the peel strength specification limit of 2.0 Lbf/inch set forth in ISO-7810. After this laminating step, the graphics 20 are printed on one or both sides of the substrate, for example by means of lithographic, flexographic or screen printing processes. The overlay layers 22 are then laminated onto the outer surfaces of the printed structure. The PVC overlay layers can be coated for adhesion, or uncoated.

In an alternative process for producing a card with the same structure, the graphics can be printed on the outer surfaces of each of the PVC core layers 16a and 16b. The durable polyester film 18 can be pre-bonded to the PVC film 22, to form a composite overlay layer, which is laminated onto the core after the printing steps. In an exemplary construction, the PVC core layers 16a, 16b can have a thickness of about 0.010 inch, and the composite overlay layer can have a thickness of about 0.004 inch, with the durable polyester films 18a, 18b having a thickness of about 0.001 inch, and the outer PVC films having a thickness of about 0.003 inch.

Figure 4:
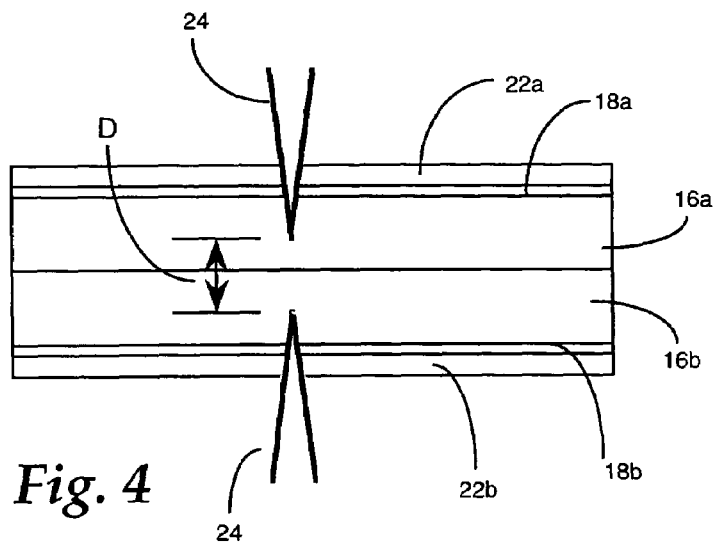
FIG. 4 is a cross-sectional view of the procedure for cutting recesses into the card to define the mini card.

As the final steps, the recesses 14 are scored into the card, to define the perimeter of the mini card, and the attachment hole 15 is drilled or punched through the card. If notches 11 are utilized, they can be formed in the card at this time. FIG. 4 illustrates one example of a technique for scoring the card to provide the recesses 14. In this example, V-shaped grooves are cut into the card by means of pairs of cutters 24. The grooves extend through the outer overlay layers 22, the durable layers 18, and partially into the core 16. The thickness of the residual core material, i.e. the distance D between the bottoms of the opposing grooves, should be about 0.16-0.30 mm, preferably about 0.26 mm, to maintain sufficient integrity that ensures the mini card remains attached to the frame during handling, yet enables the mini card to be separated with an appropriate amount of force, e.g. 11-17 kg, preferably around 14 kg.

An advantage that arises from such scoring of a card having the disclosed structure is that a clean edge is produced when the user breaks the mini card 10 away from the frame 12. More particularly, the recesses 14 pass completely through the durable layers 18a and 18b, so that the residual material consists solely of the PVC core. Since this material is relatively brittle, it produces a clean break in the area between the recesses. Conversely, in a card having a softer core, such as Teslin®, the material tends to "tear" apart, rather than break cleanly, thereby leaving a flash that results in a rougher edge.

When opposed recesses are provided in the manner shown in FIG. 4, they can extend along the entire border of the mini card where it interfaces with the frame. Alternatively, it is possible to employ a cutout that extends entirely through the thickness of the card. In this case, the cutout does not extend along the entire interface between the mini card and the frame. Rather, small gaps are left to form bridges between the mini card and the frame, that enable the mini card to be easily broken away from the frame.

After the card is produced in this manner, it may undergo a personalization process. In this process, information that is personal to the card holder is stored in the magnetic stripe and/or electronic memory of the card. In addition, the card holder's name and account number may be printed on the card. This printing occurs on the exterior surface of the overlay layer 22a on the front of the card. To protect this printed information, a layer of varnish may be applied to the overlay layer 22a, using a heated roller having a temperature around 275° C. The varnish is then cured, using ultraviolet light.

In the past, warping of cards having the conventional structure occurred as a result of the heated application of the varnish. With the cards of the present invention, e.g. having a structure of the type depicted in FIG. 3, such warping did not occur. It is believed that this result is due to the fact that the durable layers surrounding the core accommodate the stresses generated by the heat, to maintain the layers in their original relationship.

In this regard, therefore, another factor to be considered in the selection of the material for the durable layers 18 is its melting point. The melting point should be sufficiently high that the material will not flow during the brief application of heat as the varnish is applied, and compromise the integrity of the card structure. Since PET has a melting point of 254° C., it shows good resistance to the application of heat during the personalization process. Of course, if the card does not undergo processing that subjects it to the application of heat, such as personalization printing, the melting point of the durable material is not as significant.

Figure 5:
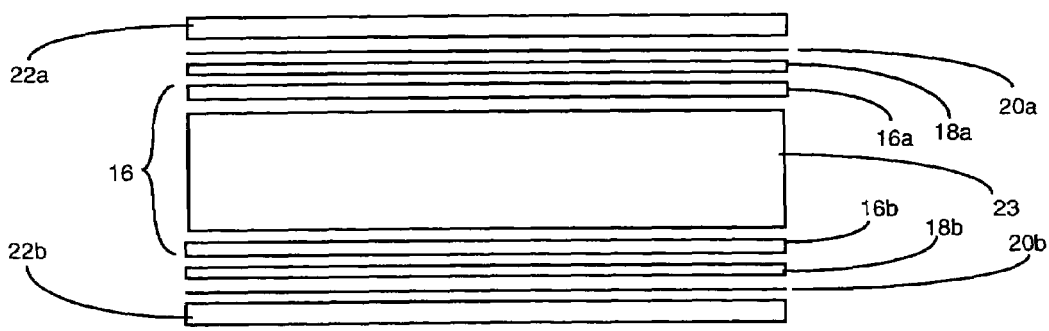
FIG. 5 is a cross-sectional view of an alternative embodiment of a mini card having an antenna.

FIG. 5 is a cross-sectional view similar to FIG. 3, illustrating an alternative embodiment of a mini card having an embedded antenna for contactless communication. As is conventional, the antenna can be incorporated into a layer of material, such as PVC, that is included in the laminations that make up the card. The antenna might be formed by a wire coil around which the PVC material is molded, or it can be formed on the PVC layer by printing a conductive ink or etching a conductive material. In the example of FIG. 5, a PVC inlay 23 containing the antenna is included in the core 16 of the card. In the case of a contactless card, the inlay 23 contains both the antenna and an electronic module with an integrated circuit chip having an electronic memory. For a dual interface card having both an antenna and surface contacts, also known as a hybrid card or combi-card, the inlay 23 contains only the antenna. In this situation, after lamination the card is milled in the area 19 to a depth that exposes terminals of the antenna. The electronic module is then inserted into the milled hole, to place it in electrical contact with the antenna. Inlays of these types are made, for example, by Smartrac Technology Ltd.

In the illustrated embodiment, the PVC inlay 23 is laminated between the two core layers 16a and 16b. The thickness of each of the two core layers is reduced, relative to the embodiment of FIG. 3, to accommodate the thickness of the inlay 23, and thereby maintain the same overall thickness for the card. For instance, if the inlay has a thickness of 0.020 in., the thickness of each of the layers 16a and 16b can be reduced by 0.010 in.

The durability of cards having a substrate consisting of a rigid core sandwiched between durable layers, in accordance with the present invention, was compared to cards having a conventional structure. The card of the present invention had a structure such as that shown in FIG. 3, with a core 16 having a thickness of about 0.022 inch. The durable layers 18a and 18b were made of PET, and each had a thickness of about 0.001 inch. The overlays were made of PVC and had a thickness of about 0.002 inch. This card is identified in the tables below as "PET/PVC/PET" (representing the layers 18a, 16 and 18b). The conventional cards had a Teslin core sandwiched between two PVC layers, and are identified in the tables as "PVC/Teslin/PVC". In these samples, the Teslin core was made up of two layers having a thickness of about 0.012 inch each, and the PVC layers were each about 0.001 inch. This card also had overlays of about 0.002 inch each.

One test that was employed to evaluate durability is a flex-to-failure test as described in ANSI INCITS 322-2002, Section 5.4. In this test, the card is flexed by repeatedly forcing opposite sides of the card toward each other and then relaxing the card, at a rate of 60 cycles per minute. For a card of standard dimension, the test specifications indicate that the card is flexed along its longer dimension from a relaxed width of 85.4 mm to a compressed width of 73.3 mm. In the shorter dimension, the card is compressed from a relaxed height of 53.7 mm to a height of 50.0 mm. The flexing continues until a fracture of at least 13 mm length is observed in the card, or 100,000 cycles is reached.

When applied to mini cards, the same stroke length between the relaxed and compressed states was employed, resulting in a smaller radius of curvature being imparted to the cards in each dimension. Table 1 below depicts the range of results for two samples of mini cards having the conventional structure and one example of a mini card constructed according to the present invention.

TABLE 1

| | Flex Cycles to Fracture | |
| Sample | Long Dimension | Short Dimension |
| --- | --- | --- |
| PVC/Teslin/PVC (1) | 4200 to 5200 | 4100 to 5000 |
| PVC/Teslin/PVC (2) | 6100 to 8600 | 900 to 2300 |
| PET/PVC/PET | 34,600 to 82,900 | 13,300 to 27,200 |

As can be seen, the durability of the card of the present invention, as measured in terms of flex-to-failure, is significantly improved over that of cards having the conventional structure. The card exhibits flex to failure greater than 10,000 cycles in each of the long and short dimensions under standardized test conditions.

As a further feature of the invention, another testing method has been developed to determine the relative durability of mini cards. Since one of the likely points of failure of a mini card is the area surrounding the attachment hole, the testing method is designed to exert torque and flexure forces in this area of the card. Such a result is accomplished by attaching a weight to the card, and then vibrating the card so that the weight can freely move relative to it, and thereby exert forces at the point of attachment.

Figure 6:
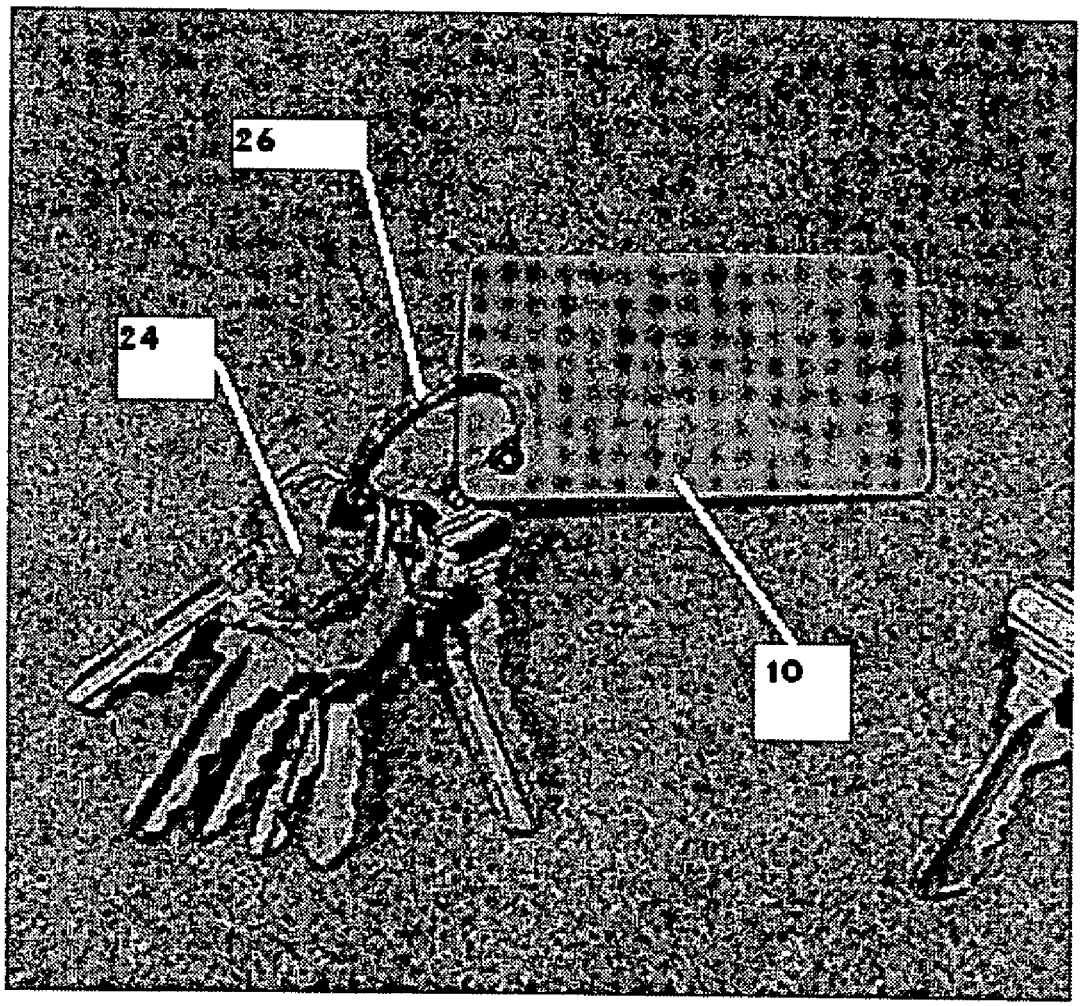
FIG. 6 is a view of a mini card with an attached weight for testing purposes.

In one embodiment of the invention, the test weight is provided by means of a set of keys attached to the card by a key ring, as illustrated in FIG. 6. For example, a set of six keys 24 will provide a total combined nominal weight of about 65 g, +/−10 g. The key ring 26 can be of the metal spring variety, preferably having a diameter in the range of 20-30 mm.

Once the keys and mini card have been assembled in this manner, the card is attached to a vibrational device. One example of a suitable vibration device is a commercial paint shaker. This type of device is particularly well suited for the testing method of the present invention, since it provides random three-dimensional motion to the mini card, to thereby simulate the types of forces to which the card is subjected during ordinary use.

Figure 7:
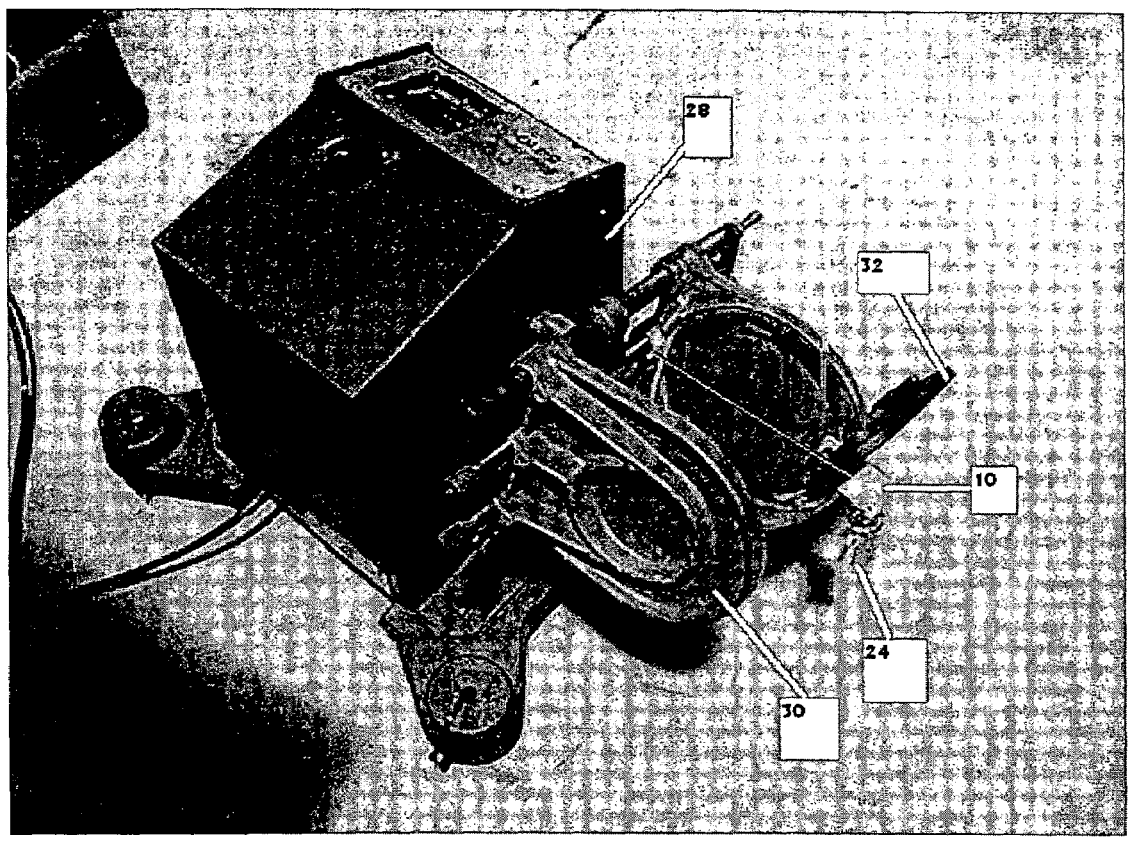
FIG. 7 is a perspective view of the mini card and weight assembly mounted in the testing apparatus.

Referring to FIG. 7, a paint shaker 28 that is suitable for use in the torque and flexure test has a pair of generally disk-shaped clamping heads 30. Once the keys have been assembled to the mini card, the card is mounted on the inside surface of one of the clamping heads. As depicted in FIG. 7, the end of the card that is remote from the attachment hole is secured to the clamping head, for example by a C-clamp 32, so that the other end of the card protrudes beyond the periphery of the clamping head, thereby permitting the keys to freely move relative to the card. The card is oriented in a generally vertical plane, preferably with its longitudinal axis aligned with the center line of the clamping head, and the attachment hole at the lower side of the card.

Alternative orientations of the mini card on the paint shaker can be employed, as long as they are consistently applied to all cards to ensure the same test conditions. In addition, two or more cards can be attached to the paint shaker at the same time, e.g. in a back-to-back manner, to provide comparative testing under the same conditions. The only requirement is that the weight be free to move relative to the card, to simulate the stresses that might be expected to occur during actual use.

Once the test procedure has been set up, the paint shaker is turned on and a timer is simultaneously actuated. The paint shaker continues to run until the key ring 26 separates from the card 10. The time at which the separation occurs is recorded, as a quantitative measurement of the durability of the card.

The spacing between the two clamping heads 30 of the paint shaker can be varied, to adjust the degree of flexure and torque energy that is imparted to the card assembly. For example, the heads can be spaced approximately 160 mm apart, to provide a baseline, or standard, force level. The degree of flexure and torque energy can be increased by moving the clamping heads 30 farther apart, or conversely decreased by moving the clamping heads 30 closer to one another.

Tables 2 and 3 illustrate the results of tests that were performed on mini cards having a conventional structure (PVC/Teslin/PVC) and a card having a substrate in accordance with the present invention (PET/PVC/PET), using the test procedure described above. The paint shaker employed for these tests was a Red Devil® model 5410 paint shaker. The testing period was limited to a maximum of 40 minutes. As can be seen from Table 2, when the clamping heads are set at a distance less than 160 mm to impart a relatively low amount of force, the card conforming to the present invention did not fail, whereas the conventional card failed approximately halfway through the test. At a more standard level of energy with a clamping head distance of 160 mm, the card of the present invention exhibited at least twice the durability of a card having a conventional structure. Thus it can be seen that the results of the torque and flexure test correlate well with those of the flex-to-failure test, namely that the card of the present invention showed significantly greater durability than the card having the conventional construction.

TABLE 2

| | | Minutes To Failure | |
| Test No. | Force | PVC/Teslin/PVC | PET/PVC/PET |
| --- | --- | --- | --- |
| 1 | Low | 21 | >40 |
| 2 | Standard | 11 | 26 |
| 3 | Standard | 11.5 | 23.5 |

At the higher energy levels depicted in Table 3, the mode of failure was observed to be more force induced, e.g. impact related, rather than the fatigue-related fractures that occurred at the standard and lower energy levels. For instance, at the two highest energy levels, the entire corner of the mini card was either completely separated or wrenched away from the remaining body of the card. None of the cards exhibited this same phenomenon at the standard and low energy levels.

TABLE 3

| | Force | Minutes To Failure | |
| Test No. | (head gap) | PVC/Teslin/PVC | PET/PVC/PET |
| --- | --- | --- | --- |
| 1 | 160 mm | 8.1 | 31.4 |
| 2 | 185 mm | 5.7 | 12.7 |
| 3 | 211 mm | 2.2 | 3.0 |

While a paint shaker represents a particularly suitable example of a device for imparting vibrational movement to the mini card and key assembly, the practical applications of the invention are not limited to the use of such a device. Rather, any device that is capable of providing random vibratory movement along one, two or three dimensions can be employed, as long as it causes the attached weight to move relative to the card with sufficient force to eventually cause failure of the card.

In another test, the card is clamped in a stationary position, with a key ring in the attachment hole. The key ring is pulled in a direction away from the card with increasing force, until it becomes separated from the card. In this test, cards having a conventional structure failed with an applied force in the range 35-37.5 Lbf. In contrast, cards constructed according to the present invention exhibited failure at an applied force of 46.5-47 Lbf, thereby confirming the improved properties of the card under conditions that might be encountered during normal use.

It will be appreciated by those of ordinary skill in the art that the present invention can be embodied in other specific forms without departing from the spirit or essential characteristics thereof. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A personal plastic card, comprising:
a core of PVC material;
a durable layer disposed at each of two opposite sides of said core, said durable layers comprising polyester material;
an overlay layer disposed at the side of each durable layer which is opposite said core; and
a breakout recess in said layers that defines a mini card having a size smaller than the dimensions of said plastic card, said breakout recess comprising a groove that extends through said overlay and durable layers and terminates in said core, to facilitate detachment of said mini card from the remainder of said plastic card.

2. The plastic card of claim 1, further including printed graphics on a surface of at least one of said durable layers, with at least a portion of said printed graphics residing within the confines of said mini card.

3. The plastic card of claim 2, wherein said printed graphics are disposed on the surface of said durable layer which faces an adjacent overlay layer.

4. The plastic card of claim 1, further including a hole through said layers within the confines of said mini card, for attachment of said mini card to another device.

5. The plastic card of claim 4, wherein said hole has a diameter sufficient to accommodate a key ring.

6. The plastic card of claim 1, wherein said overlay layers are comprised of PVC material.

7. The plastic card of claim 1, wherein said polyester material has a tensile strength of at least 28,000 psi, using the ASTM D 882 test method.

8. The plastic card of claim 1, wherein said polyester material is PET.

9. The plastic card of claim 1, wherein said polyester material is selected from the group comprising PET, ABS, nylon, Viton®, EPDM, PTFE, polypropylene and PEN.

10. The plastic card of claim 1, wherein said core has a generally rectangular shape, with a width of about 86 mm and a height of about 54 mm.

11. The plastic card of claim 10, wherein said mini card has a generally rectangular shape, with a width of about 66 mm and a height of about 40 mm.

12. The plastic card of claim 1, wherein said mini card has a durability that exceeds 10,000 cycles at a rate of 60 cycles per minute in a flex-to-failure test defined in ANSI INCITS 322-2002.

13. The plastic card of claim 1, wherein said breakout recess comprises two of said grooves respectively disposed on opposite sides of said card in alignment with one another.

14. The plastic card of claim 1, wherein said groove has a V-shaped profile.

15. The plastic card of claim 1, wherein said groove extends along the entire border of the defined mini card.

16. The plastic card of claim 1, further including an antenna embedded in said card.

17. The plastic card of claim 16, wherein said antenna is incorporated in said core.

18. A personal plastic card, comprising:
a core of PVC material;
a durable layer disposed at each of two opposite sides of said core, said durable layers comprising a material selected from the group comprising PET, ABS, nylon, Viton®, EPDM, PTFE, polypropylene and PEN;
printed graphics on the surface of at least one of said durable layers which is opposite the surface facing said core;
an overlay layer disposed at the side of each durable layer which is opposite said core, said overlay layers comprising PVC material; and
a groove extending through said overlay and durable layers, and terminating in said core, that defines a mini card that can be detached from the remainder of said card.

19. The personal plastic card of claim 18, further including a hole through said layers within the defined area of said mini card, for attachment of said mini card to an external device.

20. The personal plastic card of claim 18, having a durability that exceeds 10,000 cycles at a rate of 60 cycles per minute in a flex-to-failure test defined in ANSI INCITS 322-2002.

21. The personal plastic card of claim 18, comprising a pair of said grooves respectively disposed on opposite sides of said card in alignment with one another.

22. The personal plastic card of claims 18, wherein said groove has a V-shaped profile.

23. The personal plastic card of claims 18, wherein said groove extends along the entire border of the defined mini card.

24. A substrate for a plastic card, comprising:
a core sheet of PVC material;
a layer of durable material on each of two opposite sides of said core sheet, made from a material selected from the group comprising PET, ABS, nylon, Viton®, EPDM, PTFE, polypropylene and PEN, each of said layers of durable material having a thickness in the range of 0.0005-0.0060 inch; and
a groove extending through each of said layers of durable material and terminating in said core that defines mini card having a size smaller than the dimensions of a plastic card formed from said substrate, that is detachable from the remainder of said plastic card.

25. The substrate of claim 24, wherein said core sheet has a thickness in the range of 0.022 inch, ±0.004 inch.

26. The substrate of claim 24, wherein said durable material comprises PET.

27. The substrate of claim 24, wherein said groove has a V-shaped profile.

28. The substrate of claim 24, wherein said groove extends along the entire border of the defined section.

29. A personal plastic card, comprising:
a core of relatively rigid plastic material;
a durable layer disposed at each of two opposite sides of said core, said durable layers comprising polyester material that is less rigid than said core material;
an overlay layer disposed at the side of each durable layer which is opposite said core; and
a breakout recess in said layers that defines a mini card having a size smaller than the dimensions of said plastic card, said breakout recess comprising a groove that extends through said overlay and durable layers and terminates in said relatively rigid core, to facilitate clean detachment of said mini card from the remainder of said plastic card.

30. The plastic card of claim 24, wherein said polyester material is selected from the group comprising PET, ABS, nylon, Viton®, EPDM, PTFE, polypropylene and PEN.

31. The plastic card of claim 29, further including an antenna incorporated in said core.

32. A personal plastic card, comprising:
a core of PVC material;
a durable layer disposed at each of two opposite sides of said core, said durable layers comprising a material having a melting point of at least 254° C.;
an overlay layer disposed at the side of each durable layer which is opposite said core; and
a breakout recess in said layers that defines a mini card having a size smaller than the dimensions of said plastic card, said breakout recess comprising a groove that extends through said overlay and durable layers and terminates in said core, to facilitate detachment of said mini card from the remainder of said plastic card.

33. The plastic card of claim 32, wherein said polyester material is selected from the group comprising PET, ABS, nylon, Viton®, EPDM, PTFE, polypropylene and PEN.

34. The plastic card of claim 32, further including an antenna incorporated in said core.

35. A personal plastic card, comprising:
a core of relatively rigid plastic material;
a durable layer disposed at each of two opposite sides of said core, said durable layers comprising a material that is less rigid than said core material and has a melting point of at least 254° C.;
an overlay layer disposed at the side of each durable layer which is opposite said core; and
a breakout recess in said layers that defines a mini card having a size smaller than the dimensions of said plastic card, said breakout recess comprising a groove that extends through said overlay and durable layers and terminates in said relatively rigid core, to facilitate clean detachment of said mini card from the remainder of said plastic card.

36. The plastic card of claim 35, wherein said polyester material is selected from the group comprising PET, ABS, nylon, Viton®, EPDM, PTFE, polypropylene and PEN.

37. The plastic card of claim 35, further including an antenna incorporated in said core.

* * * * *